F. L. STUART.
RECLAIMING AND CONVEYING APPARATUS.
APPLICATION FILED MAR 4, 1918.

1,271,493.

Patented July 2, 1918.
2 SHEETS—SHEET 1.

Inventor
Francis Lee Stuart.
By his Attorneys
Baldwin Wight.

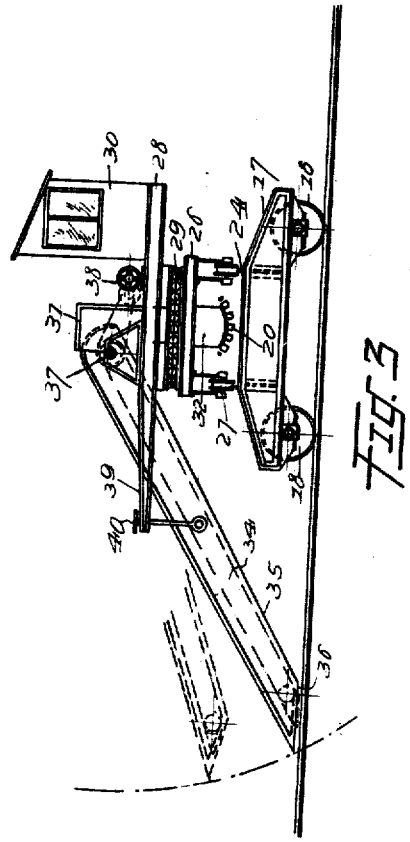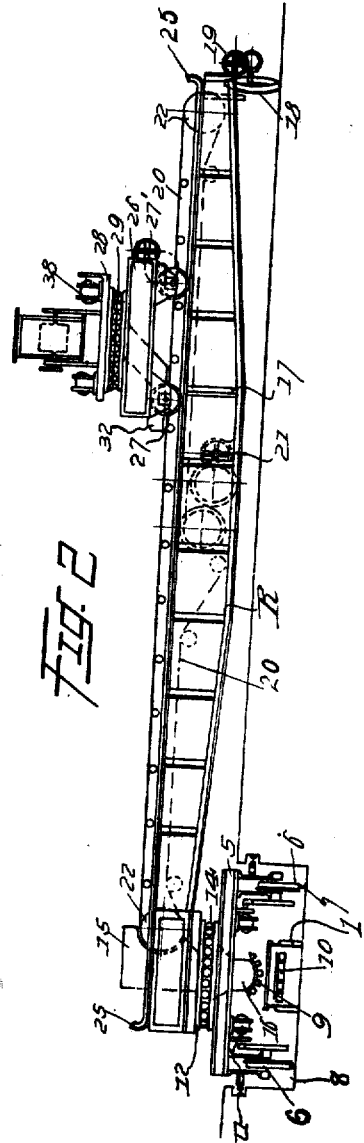

UNITED STATES PATENT OFFICE.

FRANCIS LEE STUART, OF WASHINGTON, DISTRICT OF COLUMBIA, ASSIGNOR TO THE INTERNATIONAL CONVEYOR CORPORATION, OF NEW YORK, N. Y.

RECLAIMING AND CONVEYING APPARATUS.

1,271,493.  Specification of Letters Patent.  Patented July 2, 1918.

Original application filed November 13, 1917, Serial No. 201,798. Divided and this application filed March 4, 1918. Serial No. 220,301.

*To all whom it may concern:*

Be it known that I, FRANCIS LEE STUART, a citizen of the United States, and a resident of the city of Washington, in the District of Columbia, have invented certain new and useful Improvements in Reclaiming and Conveying Apparatus, of which the following is a specification.

This invention relates broadly to conveying apparatus, and more particularly to an apparatus of this type adapted for reclaiming material from storage and transferring the same to any desired point where it may be loaded for transportation.

The object of the present invention is to provide an apparatus of this type comprising a reclaiming conveyer adapted to receive material from a digger of any desired construction which is adjustable longitudinally thereon, and deliver the same to a traveling carrier by which it may be transferred to final loading position.

This application is a division of my copending application, Serial No. 201,798 filed Nov. 13, 1917, and the claims herein are confined to the novel features of the reclaiming conveyer and longitudinally adjustable digger before referred to.

My improvements are illustrated in the accompanying drawings, in which—

Fig. 2 is a side view of a portion of the reclaiming apparatus illustrated in Fig. 1, showing the digger at right angles to the reclaimer.

Fig. 3 is a side view of the traveling digger.

Figure 1:
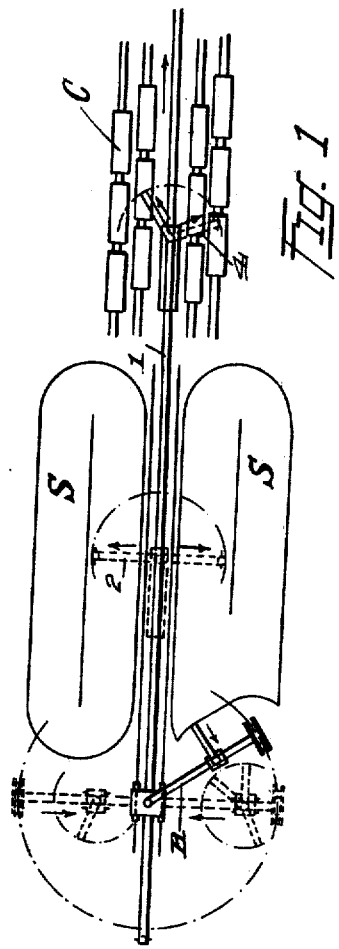
Figure 1 is a plan view diagrammatically illustrating a transferring system employing my improved reclaiming apparatus.

The present apparatus is particularly useful for reclaiming material in bulk, such as coal, ore and the like from storage piles which have previously been stocked from a main source of supply. In order to reach all parts of the storage pile it has been found desirable to provide a reclaimer or reclaiming conveyer which is bodily adjustable longitudinally of a traveling carrier, and which in turn is provided with an independently adjustable traveling digger for engaging the material in the pile and elevating the same to a position on the reclaiming conveyer.

Referring more particularly to the drawings, I have illustrated a transferring system employing a traveling carrier 1 of any desired construction, here illustrated as being a belt conveyer. The carrier 1 may be supplied directly with material from a main source, and deposit the same in suitable storage piles S by means of trimmers 2 constructed in the manner described in my Patent No. 1,241,053, of Sept. 25, 1917. On the other hand, if desired, the material may be transferred by the carrier 1 directly to cars C, or other receptacles to be loaded, and deposited therein by loading trimmers 4 of any desired construction.

It frequently happens that the main source of supply becomes exhausted before the cars C are completely filled. In such cases the reserve supply in the storage piles S is utilized through the medium of the reclaiming conveyer R hereinafter more fully described. In its preferred form the reclaiming conveyer comprises a main truck 5 carried on wheels 6 traveling on the rails 7 which are preferably disposed in a pit 8 below the main surface of the adjoining storage piles. The trackway 7 is so disposed that it straddles the traveling carrier 1 which is preferably disposed with its upper run carried by troughing rolls 9 and its lower run on supporting rolls 10. A motor 11 is provided for propelling the truck 5 to operative position along the trackway.

Mounted centrally of the truck 5 is a turn-table 12 rotatably carried by the anti-friction rolls 14. Extending centrally through the turn-table and truck is a hopper 15 having its lower end 16 disposed in discharging relation with the upper run of the traveling carrier. Supported at one end on the turn-table 12 is a trussed frame 17 mounted at its opposite end on wheels 18 having their axes so disposed that the entire frame may be rotatably adjusted relatively to the truck 5 by the motor 19. This motor is preferably positioned on the outer end of the frame work so that the power developed thereby is effective more directly in producing the swinging movement of the frame. Mounted on the frame 17 of the reclaimer is a second conveyer 20, which is preferably a belt conveyer adapted to be driven by a motor 21 mounted within the frame. Rolls 22 disposed adjacent opposite ends of the frame serve to guide the endless conveyer, one of these rolls acting as a discharging or tripper roll for delivering to the hoppen 15.

Extending longitudinally of the frame are tracks 24 having their ends 25 upturned to constitute stops.

Adapted to travel on the rails 24 is a truck 26 having flanged supporting wheels 27 and driven by a suitable motor 27'. The truck 26 is also provided with a turn-table 28 mounted on anti-friction rolls 29, and provided with an operator's station 30. A hopper 31 having its discharge 32 disposed to deliver material to the conveyer 20 in the direction of its travel, is mounted on the turn-table 28. This hopper is supplied with material directly from the storage piles by an inclined elevating digger or the like 34 mounted in a frame-work 35. Where an endless digger is employed it is adapted to pass around a guide roll 36 at its lower end and a tripper roll 37 at its upper end. An independent source of power 38 may be provided for driving the digger.

Although by disposing the truck 5 in a pit and thereby causing the upper portion of the frame 17 to extend in a substantially horizontal plane most of the material may be effectively reached, it sometimes becomes necessary to provide means for reaching material at a still higher level. This may be easily accomplished by providing extensions 39 on the truck 26 and equipping the same with hand-wheel adjusting devices 40 of any well known form so that the digger may be raised to dotted line position, as clearly shown in Fig. 3 of the drawings.

From the foregoing, it is believed that the operation of my improved reclaiming and transferring apparatus will be obvious. The truck 5 after having been moved to desired position along the trackway 7 serves as a pivotal support for the reclaimer R. This reclaimer may in turn be swung into a position in which the digger 34 will operate on the material, and the digger may be independently rotatable and longitudinally adjusted with relation to the reclaimer. It will be apparent that the digger is operative on either side of the reclaimer at will, adjustment from one side to the other being accomplished by moving the truck 26 to its extreme outer position on the tracks 24 and then swinging the digger as desired. By reason of this construction material in storage may be easily and quickly reclaimed and delivered to transferring means by which it is readily loaded for shipment.

Inasmuch as changes may be made in the structural embodiment of my improved apparatus, it is desired that the drawings be considered only as illustrative of the preferred form.

In my application for patent Serial No. 201,798, filed Nov. 13, 1917, I have shown a conveying system comprising a main conveyer belt, a track parallel therewith, a truck supported on said track, a motor for driving said truck, a turn-table carried by the truck and provided with a hopper delivering to said main conveyer belt, and a boom conveyer supported at its inner end by said turn-table delivering through the hopper to the main conveyer belt and which is pivotally mounted at its inner end to move about a horizontal axis whereby the outer end of the boom conveyer may be elevated and swung from one side of the track to the other to gather material on either side thereof. I have also shown in said application Serial No. 201,798 a digger carried by the boom conveyer and adjustable relatively thereto about a vertical axis, and also a power-driven truck on the outer end of the boom. I therefore make no claim in the present case to such subject matter.

I claim as my invention:

1. An apparatus for reclaiming material from storage and conveying the same to devices to be loaded, comprising a main receiving conveyer, a conveyer adjustable longitudinally of said receiving conveyer and arranged to discharge material thereto, means for rotatably adjusting said conveyer about the point of discharge, a digger rotatably mounted on said conveyer for supplying material from storage thereto, and means for moving the same longitudinally of the conveyer.

2. An apparatus for reclaiming stored material, comprising a main carrier for receiving said material, and delivering the same to the desired point, a truck adjustable longitudinally of said carrier, a hopper on said truck and arranged to discharge material to the carrier, a boom conveyer rotatably mounted at one end on said truck for delivering material to the hopper, and a digger longitudinally and rotatably adjustable with respect to said boom conveyer for delivering material thereto.

3. An apparatus for reclaiming stored material, comprising a main receiving conveyer, a boom conveyer rotatably adjustable with regard thereto about a vertical axis for supplying said main conveyer with material, and a digger carried by said boom conveyer and rotatably adjustable independently of said boom conveyer about both vertical and horizontal axes.

4. An apparatus for reclaiming stored material, comprising a main receiving conveyer, a boom conveyer rotatably adjustable with regard thereto for supplying said main conveyer with material, a turn-table carried by said boom conveyer, a digger supported by said turn-table and projecting sidewise from the boom conveyer and turning with the turn-table, and means for adjusting said digger vertically.

5. A reclaiming apparatus comprising a supporting truck, a turn-table carried thereby, a reclaiming conveyer supported at one end on said turn-table, a motor on the opposite end of the reclaiming conveyer for swinging the same about the turn-table, a trackway extending longitudinally of the reclaiming conveyer, and a digger adjustable along the trackway.

6. A reclaiming apparatus comprising a truck, a turn-table thereon, a reclaiming conveyer supported at one end on the turn-table, a trackway extending along said reclaiming conveyer, and a vertically and rotatably adjustable digger on said trackway.

In testimony whereof, I have hereunto subscribed my name.

FRANCIS LEE STUART.